United States Patent [19]

Bustamante et al.

[11] Patent Number: 5,009,790
[45] Date of Patent: Apr. 23, 1991

[54] METHOD FOR ABSORBING LIQUIDS USING DEALGINATE KELP

[75] Inventors: Michael R. Bustamante, Chula Vista; John J. Renaker, Jr., Valley Center; Donald A. Magley, Chula Vista, all of Calif.

[73] Assignee: Damcosur S.A. De C.V., Chula Vista, Calif.

[21] Appl. No.: 569,633

[22] Filed: Aug. 20, 1990

[51] Int. Cl.$^5$ .......................... C02F 1/28; B01J 20/22
[52] U.S. Cl. ....................................... 210/689; 134/7; 210/242.4; 210/690; 210/691; 210/924
[58] Field of Search ............... 210/671, 680, 689, 691, 210/242.4, 679, 690, 924; 134/7

[56] References Cited

U.S. PATENT DOCUMENTS 1,814,981  7/1931  Thornley et al. ............... 252/183.13
3,773,753  11/1973  Wright et al. ........................ 426/442

Primary Examiner—Robert A. Dawson
Assistant Examiner—Abeer Daoud
Attorney, Agent, or Firm—Brown, Martin, Haller & McClain

[57] ABSTRACT

A method is described for the absorption of a liquid in which one applies to a body of the liquid an absorbent material which contains dealginated, partially dewatered kelp residue. Other components, such as perlite, may also be present. The absorbent material will have a water content no greater than about 25%, preferably about 5%–10%. The absorbent material may be formed into a wide variety of shapes, including pellets, boards, blocks, granules, flakes, and the like, and in such forms may be applied in a variety of different manners to the liquid to be absorbed. The method is useful in the absorption of many types of liquids, but most importantly oil products.

12 Claims, 2 Drawing Sheets

METHOD FOR ABSORBING LIQUIDS USING DEALGINATE KELP

BACKGROUND OF THE INVENTIONS

1. Field of the Invention

The invention herein relates to methods for the absorption of liquids. In a particular aspect it relates to the absorbing of fresh oil leaks or oil spills.

2. Description of Prior Art

Oil spills nd leaks into the environment are a frequent occurrence. While the recent major spills from large oil tankers in Prince William Sound, off Huntington Beach, Calif., and in the Gulf of Mexico garner most of publicity, numerous other accidents also put substantial quantities of oil into the environment. Such accidents include tanker and barge collisions (often in enclosed waterways such as harbors), oil storage tank failures, pipeline ruptures and the like, result in harbors, rivers, beaches, estuaries, and coastlines becoming fouled and contaminated with liquid oil. Thousands of hours of cleanup work by hundreds of people are often expended, with usually only a small portion of the oil actually being recovered and removed.

In addition, there are a multitude of small oil spills, each of which is harmful in its own immediate area. Defective cars and trucks drip oil onto driveways, garage floors, parking lot surfaces, and streets, not only dirtying and discoloring the surface, but frequently seeping below the pavement and raising the potential of contaminating ground water. Similarly, many users of oil (auto and truck mechanics, service station employees and do-it-yourselfers) often spill oil onto the ground or pavement while performing their tasks.

(It will be understood that the term "oil" as used herein includes the entire spectrum of liquid petroleum products, including, but not limited to, crude oils (of both light and heavy grades) as well as refined products, including gasoline, naphtha, kerosene and lubricating oils.)

Many different techniques have been suggested for cleaning up oil spills. Application of chemical and biological agents is commonly used, but there are potential environmental risks from these agents themselves. Physical containment, as with floating booms, is of limited effectiveness, particularly where the oil is spilled into a rough water environment (as at sea) or where containment equipment is not readily at hand and cannot be made available It is generally recognized that one of the most environmentally sound methods of dealing with oil spills is to bring the oil into contact with an absorbent. The absorbent absorbs the oil and the partially or completely saturated absorbent can then be readily collected and disposed of in a safe and not polluting manner. Absorbents have several distinct advantages: they commonly act not only to absorb the oil but also to restrict its mobility and, thus, confine the spill; they can be easily used by all people attacking the oil spill, not just by specially trained workers; they can be brought into contact with the oil in variety of ways, including air drops and machine and hand application; and they are normally not themselves toxic or harmful or difficult to handle.

Over the past several years there have been a wide variety of materials put forward as intended oil absorbents. These have included tree bark, wood fiber, cotton linters, cellulosic materials such as corn cobs, cigarette filters, paper pulp, cotton, polymeric resins, granulated rock, peat moss, saw dust, straw and sponges. Most have proved ineffective in actual field use. Some materials are too light to be spread effectively, being blown away by the wind. Others become waterlogged and sink when used on oil spills on bodies of water. Others are simply too exotic, expensive or rare to be practically useful. Finally, most work only in a single environment: they are useful at sea but not on land or vice versa.

It would therefore be of significant value to have a method of collecting oil spills which utilizes an oil absorbent material which is highly absorbent, inexpensive, floats on water, non-toxic, and easily disposable. It would also be advantageous for the method to be similarly useful for collection of other liquids, including water, petro-chemicals and the like.

SUMMARY OF THE INVENTION

The invention herein is a method for the absorption of a liquid which comprises applying to a body of the liquid an absorbent material which comprises dealginated, partially dewatered kelp residue. The absorbent material useful in this invention often contains other components in addition to the dewatered, dealginated kelp residue, commonly perlite. The absorbent material useful in this invention will have a water content no greater than about 25%, preferably in the range of about 5%-10%. (All percentages herein are by weight unless otherwise specified.)

The absorbent material may be formed into a wide variety of shapes, including pellets, boards, blocks, granules, flakes, and the like, and in such forms may be applied in a variety of different manners to the liquid to be absorbed.

The invention is intended to be useful in the absorption of many types of liquids, but most importantly various oil products.

The invention has the advantage of ameliorating two serious waste and pollution problems simultaneously. It provides for the beneficial utilization of kelp residue, a material which is currently being disposed on as trash in landfills, and also provides for clean-up of oil spills.

DETAILED DESCRIPTION AND PREFERRED EMBODIMENTS

Figure 1:
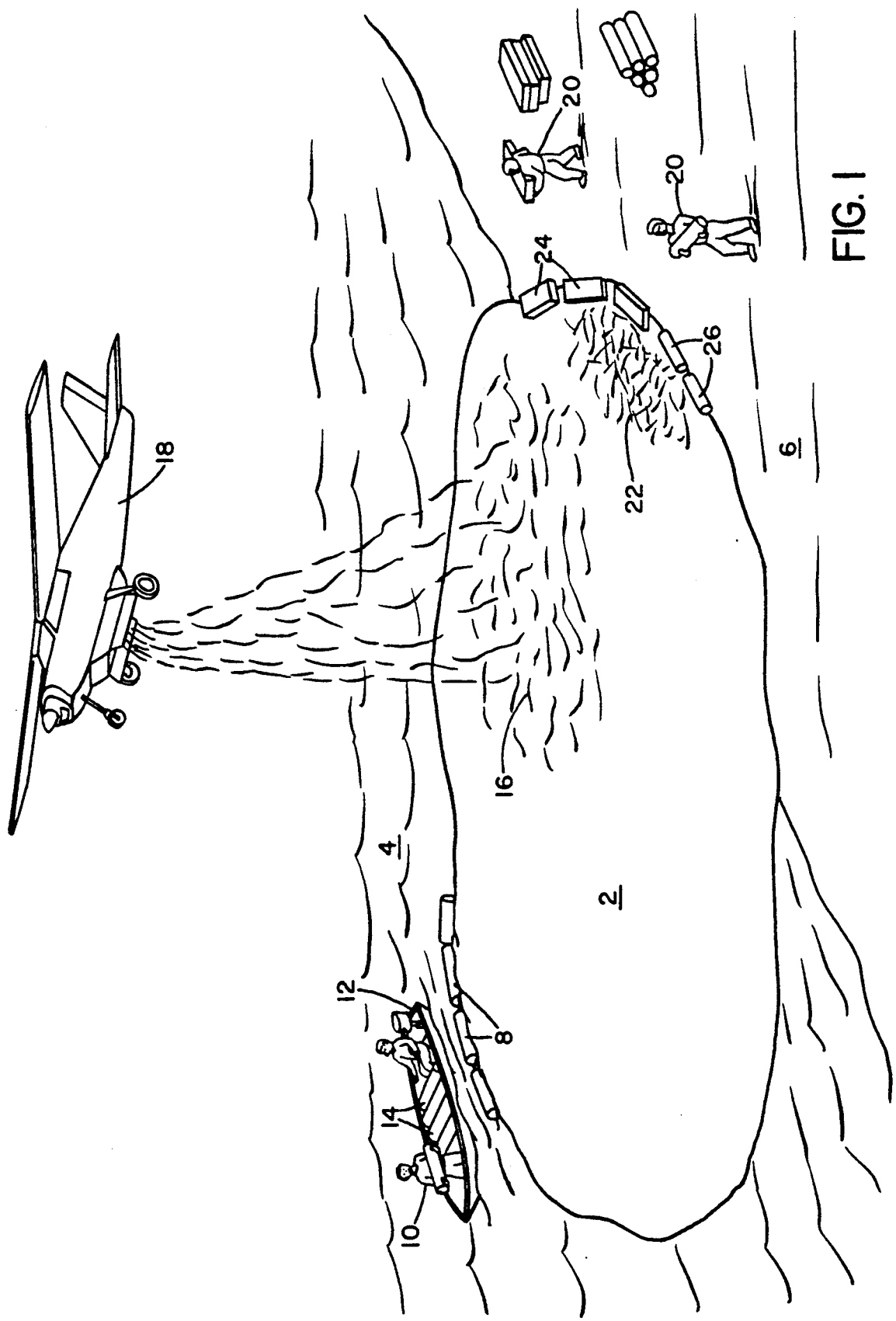
FIG. 1 is a schematic representation of the method of this invention being used to absorb an oil spill on a body of water.

In considering the description below, it will be understood by those skilled in the art that the method of this invention (as with other absorption methods of the prior art) is useful only where materials, such as oil products, which can be in liquid or solid form, are in the liquid form. For instance, once the lighter components of an oil spill have evaporated or have otherwise been dissipated, leaving only residual heavy oil components in solid form, absorption techniques are ineffective.

The critical element in the method of the present invention is the use of dealginated, partially dewatered kelp residue as the principal absorbent. Kelps are plants of the order laminariales. They are ocean plants, growing along shore lines in kelp beds. They commonly grow 100–200 ft. (30–60 m) in length and form what has been aptly described as "an underwater forest." Kelps are described in detail in Cronquist, *Introductory Botany*, 197–199 (1961).

The kelp plants are harvested by specially designed boats which cut off the tops of the kelp plants floating at the ocean surface. The collected cuttings are then brought to shore based chemical plants where the kelp is subjected to a variety of chemical reactions intended primarily to extract algin and algin based chemicals (alginates) from the kelp. Such processes have been used for many years and are widely described in the literature; see e.g. U.S. Pat. Nos. 1,814,981 to Thornley et al. and 3,773,753 to Wright et al. After the alginate is removed from the kelp, there is left a residue which is commonly referred to as cellular debris of the kelp (see the aforesaid Thornley et al. patent). This material is generally in the form of a wet pulpy mass, commonly containing as much as 85% or 90% water, with the remainder being the dealginated kelp debris and, in some cases, additional materials used in the kelp processing. (These latter are often advantageous in the present invention.) The extracted algin materials are sent on for further chemical processing not relevant to the present invention.

The exact composition of the pulpy material discharged from the kelp processing operations is variable and all specific components are not known to the inventors. For the purposes of the present invention, however, it is sufficient merely to describe it as kelp from which the algin components have been removed, leaving whatever botanical and cellular residue remains; it will be referred to as "kelp residue." The limited variation of composition is expected, since kelp, being a natural material and found under a variety of environmental conditions in different oceans of the world, can be expected to show some natural variation in composition, as indicated in the aforementioned Cronquist text.

To be suitable for use in the present invention the kelp residue discharged from the algin extraction process must be substantially dewatered, to bring the water content of the overall absorbent material down to a maximum of about 25%, and preferably down to about 5% to 10%. This can be done by any of a number of drying techniques, including spreading the kelp residue (with any included materials, such as perlite) in a thin layer over a large surface area so that it can be air dried and sun dried; by subjecting the kelp residue to a mild heat treatment (with air or gas temperature not being so high that the kelp residue becomes damaged), as for instance by placing the kelp residue in conventional drying units which have several tiers of porous platforms; and by similar drying techniques well known to those skilled in the art. It is possible to dry the kelp residue to a water content of less than about 5%, but for the purpose of the present invention such is unnecessary. Since the kelp residue may be readily dried to a water content in the range of 5% to 10%, and drying below that level becomes increasingly more difficult and expensive without any significant gain in the absorbent properties, it is preferred that the minimum water content be in the range of 5% to 10% for the absorbent material.

During the processing of kelp by the primary kelp collector and processor, it is common for other materials such as filter aids to be used and to be discarded with the kelp residue. Common among such materials which may be found in the kelp residue is perlite. Perlite is a glassy material, generally of volcanic origin. When heated it expands explosively (much in the manner of popcorn) to form a very low density granular material exceptionally well suited for use as a filter aid. The nature, properties, processing and use of perlite is conventional and widely described; see, for instance, Chesterman, "Perlite," in Lefond, ed., *Industrial Minerals and Rocks*, 927–934 (4th edn., 1975). For the purposes of the present invention the presence of the perlite is advantageous, since it has some absorption value and also helps provide buoyancy when the process of this invention is used to absorb oil floating on a body of water. The amount of perlite which may be present in association with the cellular kelp debris is not critical as long as it is not so great that the functioning of the kelp residue component is impaired. Normally, the amount of perlite present will be no greater than the amount of plant residue and normally will be somewhat less, if present at all.

Figure 3:
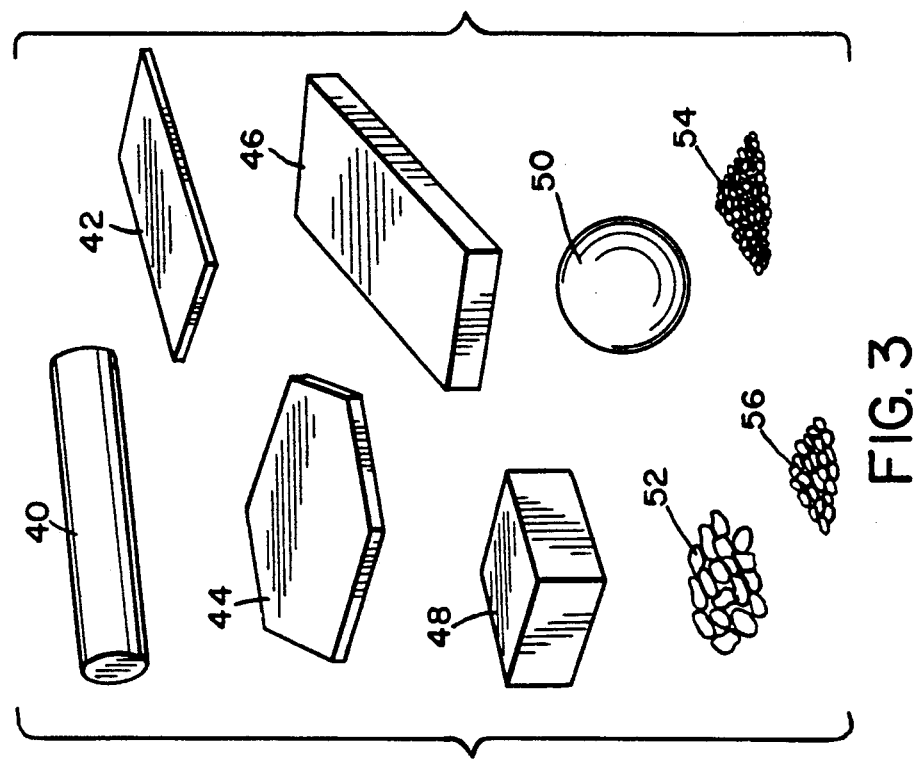
FIG. 3 illustrates schematically several representative configurations of the absorbent material useful in this invention.

During or after dewatering the "kelp waste" (which term is hereafter used for brevity to mean the composite absorbent material including the kelp residue, the remaining water content and the associated materials such as perlite, if any) may be formed into a wide variety of different shapes depending on the intended end use. Some of these are illustrated schematically in FIG. 3, and include (but are not limited to) logs 40, tiles 42, plates 44, boards 46, bricks 48 and balls 50. The kelp waste may also be granulated into particles of different sizes, including flakes 52, powders 54, granules 56 and the like. It is preferred that the particle size not be too small so that the material becomes too dusty and possibly airborne to too great a degree. Particle sizes on the order of the size of sand grains or larger are quite satisfactory.

The absorbent material may be formed into a wide variety of shapes, including pellets, boards, blocks, granules, flakes, and the like, and in such forms may be applied in a variety of different manners to the liquid to be absorbed. The various shapes may be formed by molding, extruding, grinding or other conventional techniques, as appropriate.

Figure 2:
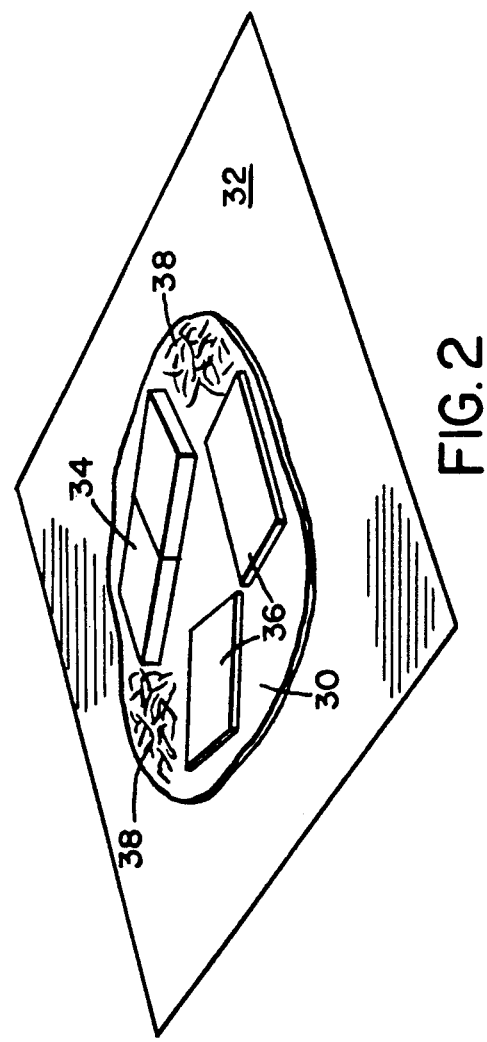
FIG. 2 is a schematic representation of the method of this invention being used to absorb oil spilled on a pavement surface.

Performance of the method of the present invention is illustrated in FIGS. 1 and 2. In FIG. 1 an oil spill 2 is shown floating on the surface of a body of water 4 and extending onto a beach 6. The waste kelp absorbent useful in the present invention is disposed in contact with the oil spill in several different forms. Around the spill there are logs 8 to absorb the oil from the edge of the spill. As each log becomes saturated with absorbed oil, its buoyancy keep it floating so it can be readily retrieved by a worker 10 in a boat 12, who then replaces the saturated log 8 with a fresh log 14.

Over the interior of the spill 2 the waste kelp absorbent in the form of granules 16 can be spread on the surface of the spill 2 from aircraft such as airplane 18. These granules 16 will absorb oil from the interior of the spill surface. They will not normally be retrieved until the spill begins to become subdivided as the oil is absorbed, but fresh air drops of absorbed particles can be repeated.

On the shore or beach 6 workers 20 can use the absorbent in the form of granules 22, bricks 24, logs 26 and the like to absorb the oil as it comes ashore. Where possible, it is also advantageous for them to place the absorbent, such as in the form of logs, in the water just off shore so that as much oil a possible may be absorbed before actually be deposited on the beach or shoreline.

This technique will be effective in the ocean, in rivers, or in lakes or other bodies of water. The degree of effectiveness will, of course, depend on the degree to which the oil remains liquid, the roughness of the water, and the speed of the water current (as in a river), if any.

FIG. 2 illustrates the clean-up and absorption of a spill 30 on a solid land surface, such as a driveway or garage floor 32. Where the surface is substantially level, such as a garage floor, the absorbent in the form of boards 34 or tiles 36 may be used effectively. When these materials are saturated with oil or when the user thinks enough oil has been absorbed, each of the individual boards, tiles or the like be collected and exchanged for fresh ones. Alternatively, the user may choose to spread the absorbent on the spill in the form of powder 38 which, following absorption of oil, is swept up and collected for discard.

Because the absorbent material of this invention does not burn at ordinary flame and furnace temperatures, the adsorbed oil may, if desired, be recovered from the absorbent material by placing the oil-laden material in a suitable recovery or cracking furnace and maintaining it at an elevated temperature at which the absorbed oil runs from the material as a heated liquid or as cracked liquid components. Those skilled in the art will be able to determine appropriate recovery temperatures for the various kinds of oils which may be absorbed.

While the invention has been described above primarily in the context of oil spill clean-up, this should be considered to be merely an illustration of a typical use of the method. This method in fact may be used for a variety of liquid absorption functions and with a variety of liquids. In addition to oil, the absorbent may also be used to absorb all other types of liquid petroleum products, such as gasoline, jet fuel, kerosene, naphtha and the like. It may be used as cat (or other animal) litter to absorb urine and other liquid animal wastes in homes, kennels, zoos, stables, and the like. It may also be used to absorb water or chemical spills, with of course the limitation that it cannot be used if the chemical in question is one which is reactive with the waste kelp or which would have a detrimental effect on the waste kelp structure. For instance, it is not expected that this method could be used to absorb most highly acidic or corrosive liquids. Those skilled in the art will be well away of the practical limitations of this type; if there is any doubt about whether the method will be useful, one can easily test one or a few material samples on a small section of the liquid body and observe the effects.

It will be evident to those skilled in the art that there are numerous embodiments of this invention which, while not expressly set forth above, are clearly within the scope and spirit of the invention. Therefore the above description is to be considered exemplary only, and the actual scope of the invention is to be defined solely by the appended claims.

We claim:

1. A method for the absorption of a liquid which comprises applying to a body of said liquid an absorbent composition which comprises dealginated, partially dewatered kelp residue.

2. A method as in claim 1 wherein said composition has a water content not greater than 25% by weight.

3. A method as in claim 2 wherein said composition has a water content in the range of about 5%-10% by weight.

4. A method as in claim 1 wherein said composition also comprises perlite.

5. A method as in claim 1 wherein said absorbent composition is formed into the shape of a log, tile, plate, board, brick, or ball.

6. A method as in claim 1 wherein said absorbent composition is granulated into particles.

7. A method as in claim 6 wherein said particles are in the form of flakes, powders or granules.

8. A method as in claim 1 wherein said absorption is achieved by placing said absorbent composition into contact with said body of liquid at the periphery of said body or at an interior surface of said body.

9. A method as in claim 1 wherein said liquid is a petroleum material.

10. A method as in claim 9 wherein said petroleum material is a crude oil or refined petroleum product.

11. A method as in claim 10 wherein said refined petroleum product is gasoline, naphtha, kerosene or lubricating oil.

12. A method as in claim 1 wherein said liquid is water, a chemical or liquid animal waste.

* * * * *